(12) United States Patent
Carroll et al.

(10) Patent No.: US 7,313,616 B1
(45) Date of Patent: Dec. 25, 2007

(54) WEB SITE MANAGEMENT IN A WORLD WIDE WEB COMMUNICATION NETWORK THROUGH PERIODIC REASSIGNMENT OF THE SERVER COMPUTERS DESIGNATED FOR RESPECTIVE WEB DOCUMENTS RELATED TO DOCUMENT WEIGHT BASED ON BYTE COUNT AND PROGRAM CONTENT

(75) Inventors: Scott Allen Carroll, Elgin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1407 days.

(21) Appl. No.: 09/506,235

(22) Filed: Feb. 17, 2000

(51) Int. Cl.
*G06F 15/173* (2006.01)
*G06F 15/16* (2006.01)
*G06F 15/177* (2006.01)

(52) U.S. Cl. .................. 709/224; 709/219; 709/221

(58) Field of Classification Search ............... 709/226, 709/217–224
See application file for complete search history.

(56) References Cited

U.S. PATENT DOCUMENTS

| | | | | |
|---|---|---|---|---|
| 5,548,724 A * | 8/1996 | Akizawa et al. | ............ | 709/203 |
| 5,924,116 A * | 7/1999 | Aggarwal et al. | .......... | 709/216 |
| 6,070,191 A * | 5/2000 | Narendran et al. | ......... | 709/226 |
| 6,167,446 A * | 12/2000 | Lister et al. | ................ | 709/223 |
| 6,173,322 B1 * | 1/2001 | Hu | .............................. | 709/224 |
| 6,175,869 B1 * | 1/2001 | Ahuja et al. | ................. | 709/226 |
| 6,275,858 B1 * | 8/2001 | Bates et al. | .................. | 709/228 |
| 6,279,001 B1 * | 8/2001 | DeBettencourt et al. | ...... | 707/10 |
| 6,314,465 B1 * | 11/2001 | Paul et al. | ................... | 709/226 |
| 6,330,602 B1 * | 12/2001 | Law et al. | .................... | 709/224 |
| 6,374,336 B1 * | 4/2002 | Peters et al. | ................. | 711/167 |
| 6,381,740 B1 * | 4/2002 | Miller et al. | ................. | 717/151 |
| 6,393,418 B1 * | 5/2002 | Hikita et al. | ................. | 709/219 |
| 6,425,057 B1 * | 7/2002 | Cherkasova et al. | ........ | 709/219 |
| 6,430,618 B1 * | 8/2002 | Karger et al. | ............... | 709/225 |
| 6,438,652 B1 * | 8/2002 | Jordan et al. | ............... | 711/120 |
| 6,449,688 B1 * | 9/2002 | Peters et al. | ................ | 711/112 |

* cited by examiner

*Primary Examiner*—Joseph E. Avellino
(74) *Attorney, Agent, or Firm*—Jerry B. Kraft; Mark S. Walker (57) ABSTRACT

A World Wide Web (Web) distribution site for accessing a plurality of Web documents from a database through a distribution system comprising a plurality of server computers of different computer powers wherein server computers are designated for documents based upon document weights calculated for the Web documents. The system has means for determining a document weight for each of said plurality of Web documents, which include means for counting the total number of bytes of 15 data representing the content of each of said documents, means for assigning a complexity weight to programs in each of said plurality of documents, and means for multiplying the byte total for each Web document by the complexity weight of the Web document. Based upon said 20 document weights, the system provides means for designating the server computers for said respective Web documents. The server system at Web distribution sites automatically periodically monitors the Web documents for 25 significant changes in content resulting in document weights, and adjust its applied server computer resources to effectively cover such changes in content for the Web documents managed through the distribution site.

16 Claims, 5 Drawing Sheets

WEB SITE MANAGEMENT IN A WORLD WIDE WEB COMMUNICATION NETWORK THROUGH PERIODIC REASSIGNMENT OF THE SERVER COMPUTERS DESIGNATED FOR RESPECTIVE WEB DOCUMENTS RELATED TO DOCUMENT WEIGHT BASED ON BYTE COUNT AND PROGRAM CONTENT

CROSS-REFERENCE TO RELATED COPENDING PATENT APPLICATIONS

The following patent application assigned to the assignee of the present invention and filed concurrently herewith, covers subject matter related to the subject matter of the present invention: WEB SITE MANAGEMENT IN A WORLD WIDE WEB COMMUNICATION NETWORK THROUGH REASSIGNMENT OF THE SERVER COMPUTERS DESIGNATED FOR RESPECTIVE WEB DOCUMENTS BASED UPON USER HIT RATES FOR THE DOCUMENTS, Carroll et al. Ser. No. 09/506,237.

TECHNICAL FIELD

The present invention relates to computer managed communication networks such as the World Wide Web (Web) and, particularly, to the management and effective operation of Web Sites from which Web documents, such as Web pages and Web programs, are distributed in response to user requests.

BACKGROUND OF RELATED ART

The 1990's have been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents including media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents including media and computer programs. In addition, Hypertext Markup Language (HTML), which had been the documentation language of the Internet or Web for years, offered direct links between Web pages. This even further exploded the use of the Internet or Web.

Web documents are provided from a Web distribution site usually made up of one or more server computers which access the document from a resource database in response to a user request sent over the Web through a Web browser on the user's receiving Web station. Significant Web distribution sites are made up of a plurality of server computers coordinated through a primary one of said servers. Such significant Web distribution sites usually serve large institutions such as corporations, universities, retail stores or governmental agencies. These distribution sites may also provide to smaller businesses or organizations support for and distribution of individual Web pages created, owned and hosted by the individual small businesses and organizations.

In such Web distribution sites, each of the Web documents or pages are assigned to one of the server computers which supports and distributes the respective Web documents or pages. These server computers are usually of different computer powers. The above-referenced copending application covers a system in which hit rates for the Web documents distributed through the site are monitored and server computer resources are allocated to meet surges in hit rates for the various Web documents by designating the server computers for said respective Web documents based upon said rate of user hits. The server computers of the most computer power are designated for the Web documents having the highest hit rate. This permits some optimizing of server computer resources at the Web distribution site.

Because of the rapidly expanding potential of Web documents and the varied consumer and business demands for a wide variety of data from Web documents, it is not unusual for hosts or owners who control the contents of many source Web documents to change such contents on a daily if not on an hourly basis. Of course, Web document content may be varied dramatically from simple HTML text to relatively complex animated images using the JPEG format. Thus, a Web document which is completely manageable by its designated server today may be greatly upgraded tomorrow so that its designated server may be strained to virtual inoperability.

SUMMARY OF THE PRESENT INVENTION

The present invention provides a system whereby the Web distribution site may automatically monitor the Web documents for significant changes in content and adjust its applied server computer resources to effectively cover such changes in content for the various Web documents managed through the distribution site.

In its broadest aspects, the present invention provides a Web server system for accessing said stored Web documents from resource databases and transmitting said Web documents onto said Web comprising a plurality of server computers of different computer powers at a resource location, and a plurality of stored Web documents, each accessible from said resource database by a designated at least one of said server computers.

The system also has means for determining a document weight for each of said plurality of Web documents which include means for counting the total number of bytes of data representing the content of each of said documents, means for assigning a complexity weight to programs in each of said plurality of documents, and means for multiplying the byte total for each Web document by the complexity weight of the Web document. Based upon said document weights, the system provides means for designating the server computers for said respective Web documents. The system may be set up so that the means for designating the server computers designate the server computers of the most computer power for the Web documents having the highest document weight.

The host or owner of the Web document may change its content at any time. Thus, the system provides means for periodically redetermining the document weights for each of said plurality of documents, and means for redesignating said server computers for said respective Web documents based upon said redetermined document weights.

The portion of said data representing the content of each of said documents preferably has an HTML format while the portion of said data representing the content of each of said documents has an JPEG format.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
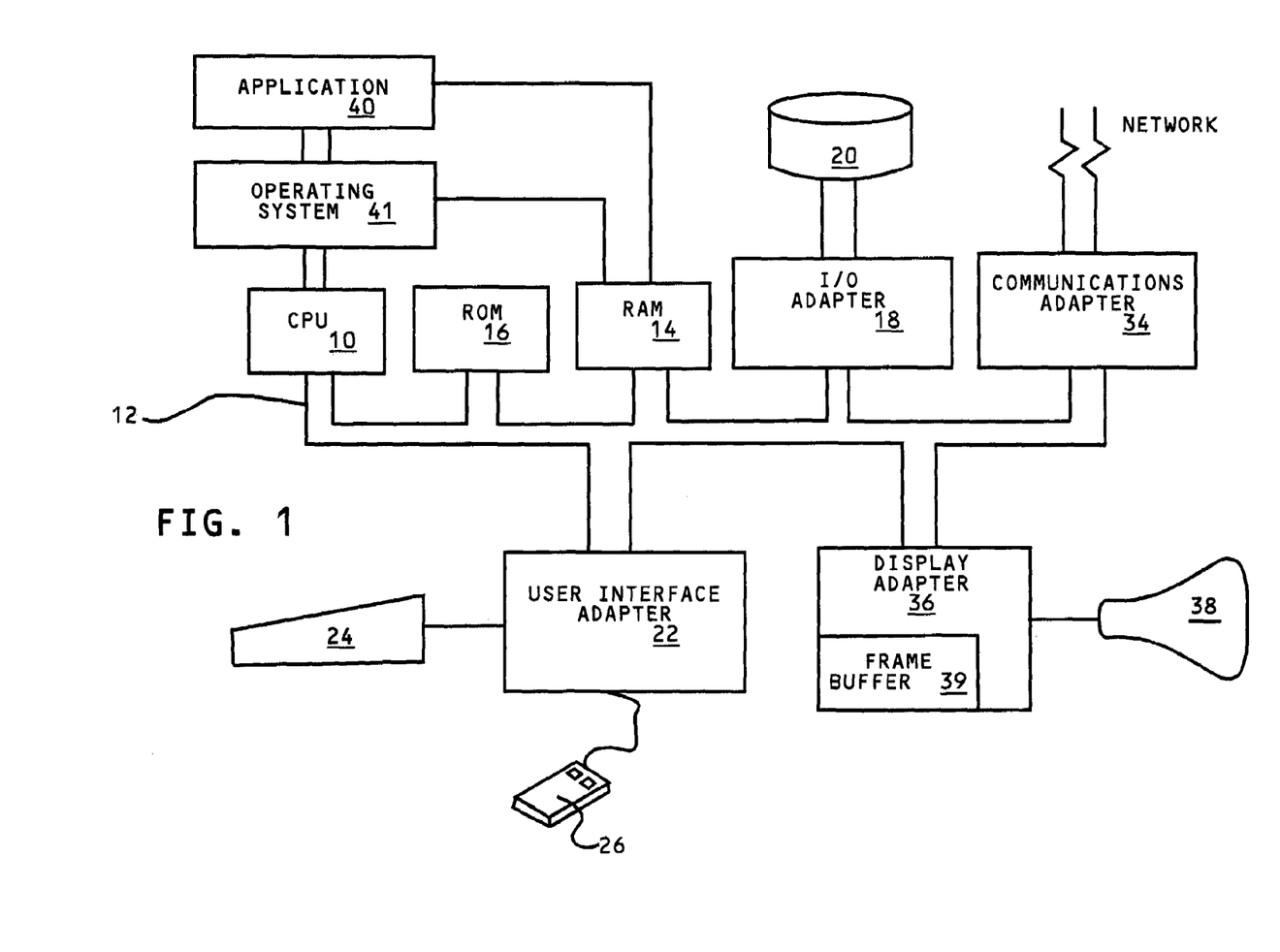
FIG. 1 is a block diagram of a data processing system including a central processing unit and network connections via a communications adapter which is capable of functioning as any of the server computers in the Web distribution site or as a user interactive Web station for receiving Web pages.
Figure 2:
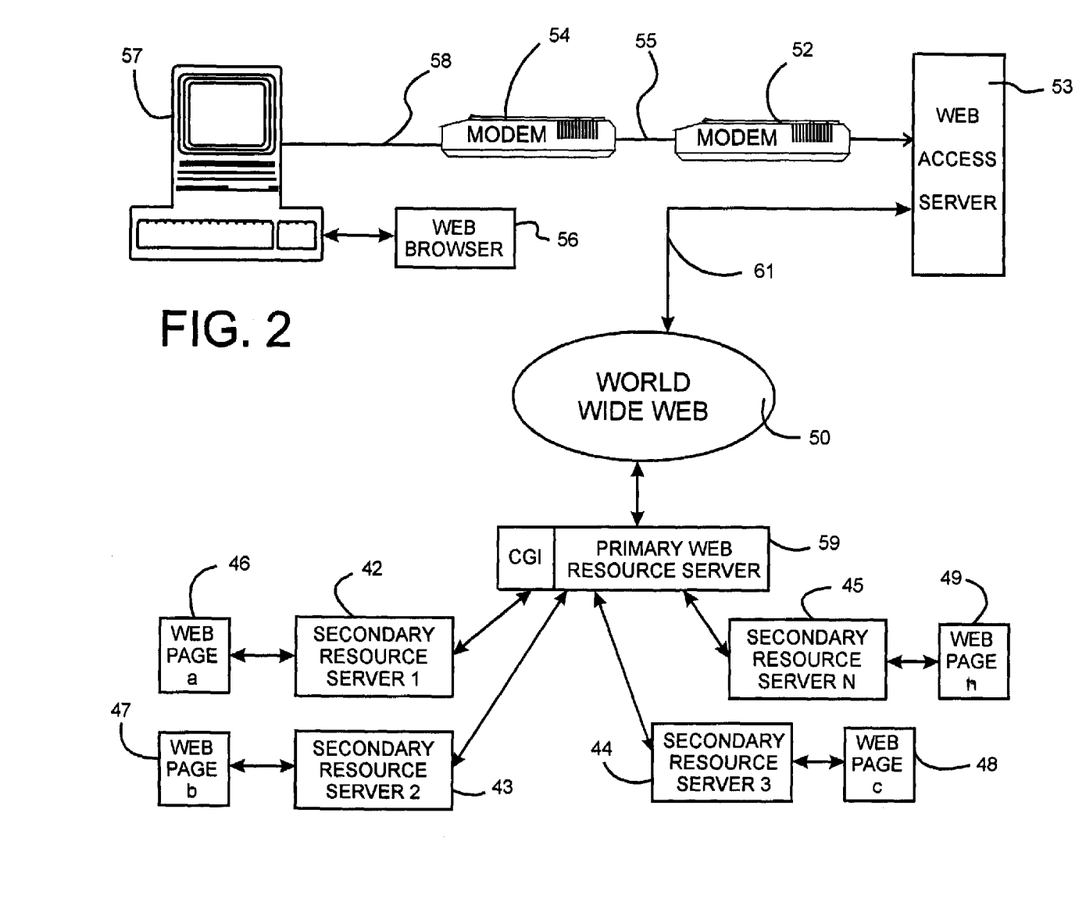
FIG. 2 is a generalized diagrammatic view of a Web portion showing how the Web may be accessed from the Web stations for the requesting Web pages and the Web distribution site of the present invention for distributing such Web pages.

Referring to FIG. 1, a typical data processing system is shown which may function as the computer controlled network terminals or Web stations used conventionally as any of the receiving Web stations for requesting Web pages; the system shown is also illustrative of any of the server computers used in the Web distribution sites to be described in greater detail with respect to FIG. 2.

A central processing unit (CPU) 10, may be one of the commercial PC microprocessors; when the system shown is used as a server computer at the Web distribution site to be subsequently described, then a workstation is preferably used, e.g. RISC System/6000™ (RS/6000) series available from International Business Machines Corporation (IBM). The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory Random Access Memory (RAM) 14. These programs include the programs of the present invention for the determining and redetermining of Web document weights at the Web distribution site and for reallocation or redesignation of servers assigned to the Web documents.

Where the computer system shown functions as the receiving Web station, then any conventional Web browser application program, such as the Netscape Navigator 3.0™ or Microsoft's Internet Explorer™, will be available for accessing the Web pages from the Web to the receiving station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the computer system to communicate with other such computers over a local area network (LAN), e.g. the related server computers at the Web distribution site or through the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web documents or pages transmitted over global networks, such as the Web or Internet, an understanding of networks and their operating principles would be helpful. We will not go into great detail in describing the networks to which the present invention is applicable. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. A combination of such computer servers function at Web distribution sites to access requested Web documents from resource databases and to distribute such accessed documents to the requesting receiving stations over the Web. Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. In addition, a general and comprehensive description of browsers may be found in the above-mentioned *Mastering the Internet* text at pp. 291-313.

A generalized diagram of a portion of the Web for illustration of the Web distribution site of the present invention is shown in FIG. 2. The computer controlled display terminal 57 used for Web page receiving may be implemented by the computer system setup in FIG. 1 and connection 58 (FIG. 2) is the network connection shown in FIG. 1. For purposes of the present embodiment, computer 57 serves as a Web display station for receiving the Web documents. Reference may be made to the above-mentioned *Mastering the Internet*, pp. 136-147, for typical connections between local display stations to the Web via network servers, any of which may be used to implement the system on which this invention is used.

The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web documents is downloaded to display terminal 57 through Web access server 53 via the telephone line linkages from server 53 which may have accessed them from the Internet 50 via linkage 61.

The Web site distribution elements used in the implementation of the present invention are made up of primary Web resource computer server 59 connected to the Web 50 which manages the other secondary Web resource computer servers: secondary resource server (1) 42, secondary resource server (2) 43, secondary resource server (3) 44 and secondary resource server (n) 45. These servers are respectively assigned to support and service Web page (a) 46, Web page (b) 47, Web page (c) 48 and Web page (n) 49. These secondary servers function in response to Web document requests or hits to access the source Web page 46, 47, 48 or 49 from its respective resource database and have a copy of the accessed source page sent via the Web 50 to the requesting Web station 57. As will be described in greater detail with respect to the programs described in FIGS. 3A, 3B and 4, the present invention provides for the continuous periodic determining and redetermining of the document weights for respective Web pages or documents and for reassigning the secondary servers servicing the respective Web pages or documents responsive to changes in the redetermined document weights.

In standard Web distribution sites, the owners or hosts of the Web documents serviced through the site have full control over content and, thus, can significantly change the document content at any time so that the server resources servicing that Web document may become sufficiently strained that the document is no longer adequately supported by the designated server computer. The present invention periodically recalculates the document weights of illustrative Web pages 46 through 49 in FIG. 2, and reallocates or redesignates the secondary server computers 42 through 45 based on that recalculation. This reassignment or reordering of the assigned secondary servers is automatic and continuous.

As a general rule, and for purposes of this illustration, the secondary server computers are reassigned to Web pages on the basis that the Web document at the Web distribution site with the highest document weight will be assigned the secondary server with the most computer power and so on. However, this general rule will not always be strictly applied. Under certain circumstances two or more server computers may be assigned to a Web document based upon the combination of a high document weight and a very high hit rate, as described in the above cross-referenced copending Carroll et al. Patent Application. Under other circumstances two more Web documents, because of combinations of relatively low document weights and low hit rates, may share a single server computer.

In any event, the present invention involves the monitoring and periodic redetermining of document weights and the redesignation of the server computers for the Web documents based upon such redetermined document weights.

The periodic redetermination of Web document weights and reassignment of the secondary server computers based on document weights is carried out in the primary Web resource computer server 59 with programs to be subsequently described.

The periodic monitoring and reassignment of servers is preferably done in the CGI (Common Gateway Interface) of the primary Web server computer 59. The CGI in the primary server 59 controls communications between server and resources. The CGI controls Web site server and Web page interactivity. CGI functions are described in the *Microsoft Press Computer Dictionary* at pp. 85.

Figure 3A:
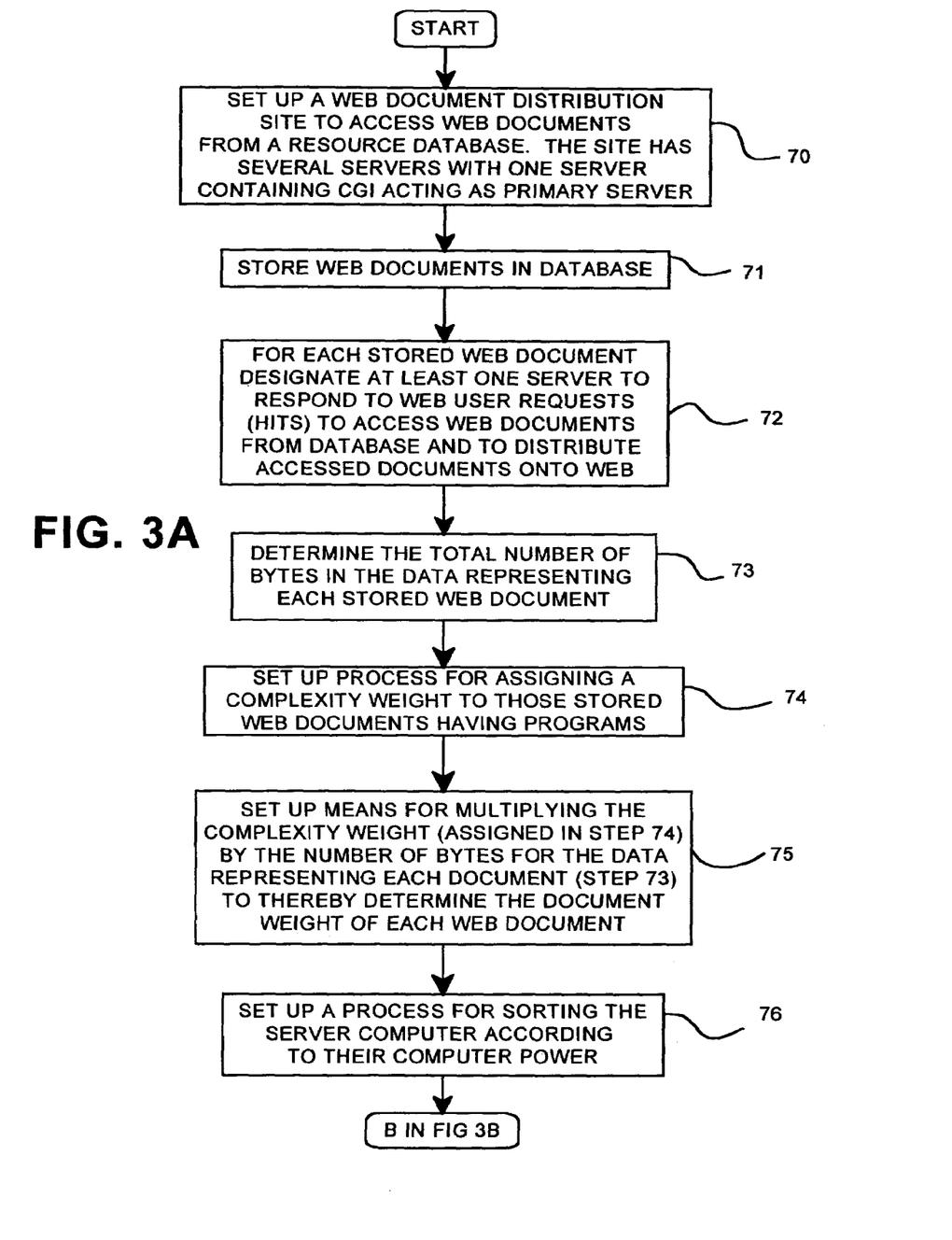
FIGS. 3A and 3B are an illustrative flowchart describing the setting up of a Web distribution site with a process for periodically redetermining the document weights of the Web documents distributed through the site, and for reallocating computer server resources at the site in response to changes in such document weights.
Figure 3B:
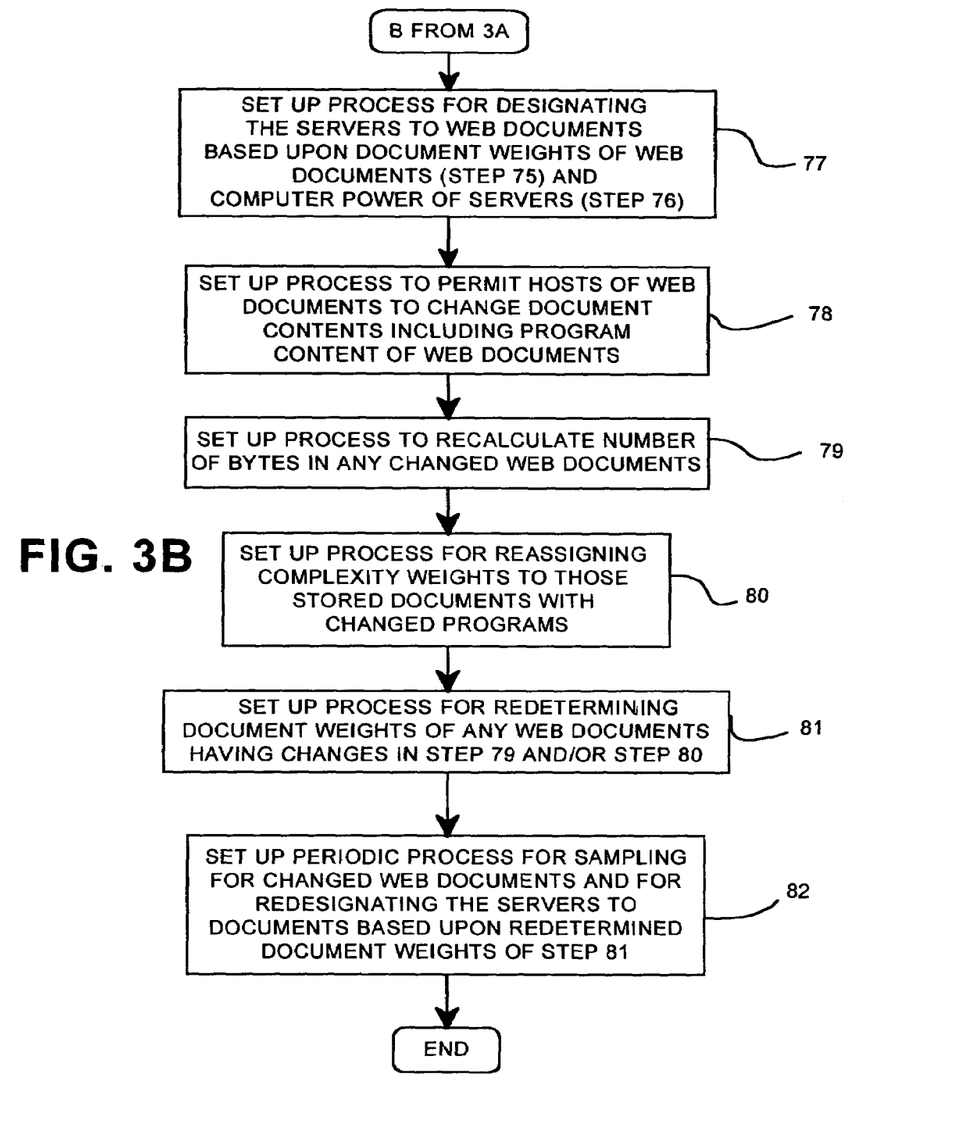

FIGS. 3A and 3B are a flowchart showing the development of a process according to the present invention for the determination and redetermination of document weights and the redesignation of server computers to such Web documents at Web document distribution sites.

Now with respect to FIG. 3A, in step 70, a Web document distribution site, such as that shown in FIG. 2, is set up to access Web documents from resource databases. The site has several servers with one server containing the CGI serving as the Primary or Managing server. The Web documents are stored in databases accessible by the servers at the Web distribution site, step 71. For each stored Web document, there is designated at least one server to respond to Web requests (hits) to access Web documents from the database and to distribute the accessed documents onto the Web, step 72. A process is set up, step 73, to determine the total number of bytes in the data representing each stored Web document, i.e. the source Web document from which copies are distributed in response to hits. The byte content may be readily determined by any of the conventional processes which keep track of the byte content of data representing a stored document. The basic Web document has an HTML and images in the document are stored as JPEG or GIF data files. The data byte counts of HTML, JPEG and GIF documents is readily determinable by conventional methods. In addition, a process is set up for assigning a complexity weight value to any program contained in the Web document, step 74. This could readily be done through interactive prompting of the host responsible for the Web document contents. If the document host is, for example, upgrading the document and he adds a program, then he is prompted on the display screen to assign a weight to the program. An example would be that the host would be prompted to chose from three values: "1" for simple programs; "2" for programs of intermediate complexity; and "3" for complex programs. Then a routine may be set up, step 75, to multiply the byte count of the Web document times the complexity weight to thereby get the document weight. Then the computer power of each of the servers is noted and a process is set up for sorting and ordering the servers according to their computer power, step 76, and the flow branches to point B in FIG. 3B where a process is set up for designating servers to Web documents according to their document weight, step 77.

Of course, hosts of Web documents are continually permitted to change the content of their documents at any point in time, step 78. Thus, a routine is set up to periodically recalculate the number of bytes in any changed Web documents, step 79, and a process like that described with respect to step 74 is set up for assigning a complexity weight for all Web documents in which the program content has been changed, step 80. Then, step 81, set up a process like that described above with respect to step 75 for redetermining the document weights for any documents the contents of which have been changed in steps 79 and 80.

The redetermination of the Web document weights as described in steps 78 through 81 for documents having changed contents is set up to be repeated on a regular cyclic basis, step 82. Where the operating system in the server computer distribution system used is a Unix or an AIX type, the periodic sampling may be done through a Unix system routine known as a "cron-job", scheduled and carried out with the operating system's "cron" facility which is described in greater detail in the text *AIX/6000 System Guide*, Frank Cervone, 1996, McGraw-Hill Companies Inc., New York at pp. 215-222.

Figure 4:
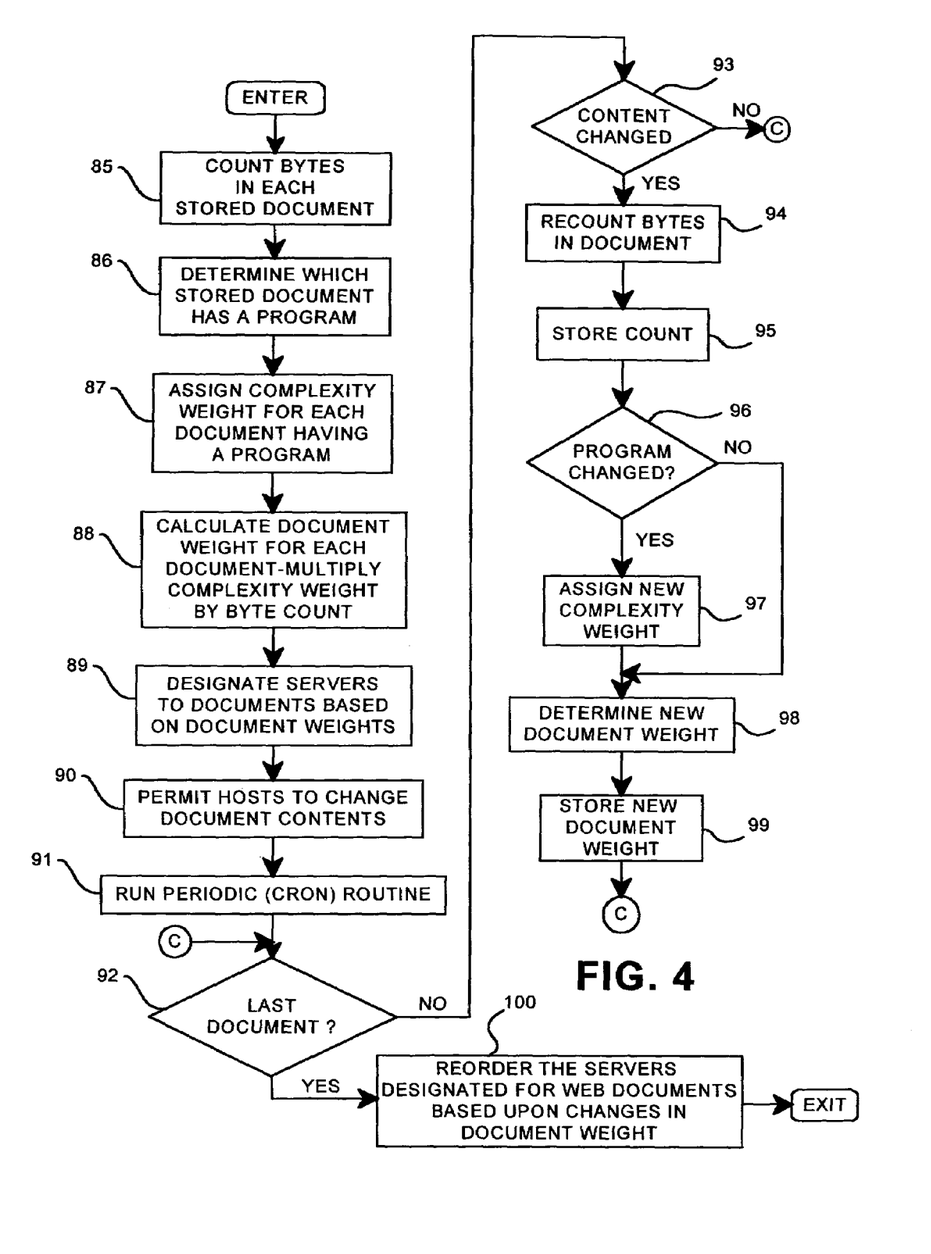
FIG. 4 is a flowchart of an illustrative run of the program set up in FIGS. 3A and 3B.

A simplified run of the process set up in FIGS. 3A and 3B and described in connection with FIG. 2 will now be described with respect to the flowchart of FIG. 4. First, there is an initial determination made for each stored Web document for the distribution site: the bytes in each document are counted, step 85; determinations have been made as to which documents contain programs, step 86; and a complexity weight assigned to each document having a program, step 87. Then, step 88, the document weight is calculated as described above for each document, and the servers are designated for the respective documents as previously described by relating the computer powers of the servers to the document weights of the documents, step 89. The owner or host who controls content is then permitted to change content at will, step 90. Thus, the status of the document content may be continually changed.

The process is set up so that the periodic cron routine will be run on a regular cycle, step 91. We start the routine with a determination as to whether the last document has been sampled, step 92; if Yes, then the computer servers are redesignated for the Web documents based upon any changes in document weights which appeared in this cyclic iteration, step 100, and the present periodic iteration in the cron cycle is ended. If the decision from step 92 is No, we are not at the last document, then step 93, a determination is made as to whether the content of the next document has been changed. If No, then the process branches back to step 92 via branch "C". If the decision from step 93 is Yes, the document has been changed, then the byte content is recounted, step 94, and the count stored, step 95, after which a further determination is made as to whether any program in the Web document has been changed or a new program added, step 96. If step 96's determination is Yes, then a new complexity weight should have been assigned to the program, step 97. Irrespective of whether step 96 was Yes or No, the new document weight is redetermined, step 98, the new document weight stored, step 99, so as to be available for the above-described redesignation of server computers at the end of each cyclic iteration as previously described in step 100, and the process branches back to step 92 via branch "C".

One of the preferred implementations of the present invention is in application programs 40 made up of programming steps or instructions resident in RAM 14, FIG. 1, of Web server computers during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web (Web) communication network, a Web server system for accessing stored Web documents from resource databases and transmitting said Web documents onto said Web comprising:
   a plurality of server computers of different computer powers at a resource location;
   a plurality of stored Web documents, each accessible from said resource database by a designated at least one of said server computers;
   means for determining a document weight for each of said plurality of Web documents including:
      means for counting the total number of bytes of data representing the content of each of said documents,
      means for assigning a complexity weight to programs in each of said plurality of documents, and
      means for multiplying the byte total for each Web document by the complexity weight of the Web document,
   means for designating the server computers for said respective Web documents based upon said document weights,
   means for changing the content of each of said documents,
   means, responsive to said means for changing the content, for periodically redetermining the document weights for each of said plurality of documents, and
   means, responsive to said means for changing the content, for redesignating said server computers for said respective Web documents based upon said redetermined document weights.

2. The Web communication network of claim 1 wherein said means for designating said server computers designate the server computers of the most computer power for the Web documents having the highest document weight.

3. The Web communication network of claim 1 wherein said means for designating said server computers further includes means for designating a plurality of said server computers for the Web documents having the highest document weights.

4. The Web communication network of claim 1 wherein a portion of said data representing the content of each of said documents has an HTML format.

5. The Web communication network of claim 4 wherein a portion of said data representing the content of each of said documents has a JPEG format.

6. In a Web communication network, with a Web server system of a plurality of server computers of different computer powers at a resource location, a method for accessing stored Web documents from a resource location database and transmitting said Web documents onto said Web comprising:
   providing a plurality of stored Web documents, each accessible from said resource database by a designated at least one of said server computers;
   determining a document weight for each of said plurality of Web documents by steps including:
      counting the total number of bytes of data representing the content of each of said documents, assigning a complexity weight to programs in each of said plurality of documents, and multiplying the byte total for each Web document by the complexity weight of the Web document, designating the server computers for said respective Web documents based upon said document weights, changing the content of at least one of said documents, responsive to said changing of the content, periodically redetermining the document weights for each of said plurality of documents, and responsive to said changing of the content, redesignating said server computers for said respective Web documents based upon said redetermined document weights.

7. The method of claim 6 wherein said step of designating said server computers designates the server computers of the most computer power for the Web documents having the highest document weight.

8. The method of claim 6 wherein said step of designating said server computers designates a plurality of said server computers for the Web documents having the highest document weights.

9. The method of claim 6 wherein a portion of said data representing the content of each of said documents has an HTML format.

10. The method of claim 9 wherein a portion of said data representing the content of each of said documents has a JPEG format.

11. A computer program having code recorded on a computer readable medium for accessing stored Web documents from a database served by a plurality of server computers of different computer powers at a resource location on the Web communication network and transmitting said Web documents onto said Web network comprising:

a plurality of stored Web documents, each accessible from said database by a designated at least one of said server computers;

means for determining a document weight for each of said plurality of Web documents including:

means for counting the total number of bytes of data representing the content of each of said documents, means for assigning a complexity weight to programs in each of said plurality of documents, and means for multiplying the byte total for each Web document by the complexity weight of the Web document, means for changing the content of each of said documents, means, responsive to said means for changing the content, for periodically redetermining the document weights for each of said plurality of documents, and means, responsive to said means of the content, for redesignating said server computers for said respective Web documents based upon said redetermined document weights.

12. The computer program of claim 11 wherein said means for designating said server computers designate the server computers of the most computer power for the Web documents having the highest document weight.

13. The computer program of claim 11 wherein said means for designating said server computers further includes means for designating a plurality of said server computers for the Web documents having the highest document weights.

14. The computer program of claim 11 wherein a portion of said data representing the content of each of said documents has an HTML format.

15. The computer program of claim 14 wherein a portion of said data representing the content of each of said documents has a JPEG format.

16. The computer program of claim 11 wherein said program is a Unix-type program, and said steps of periodically redetermining the document weights and redesignating said server computers are carried out by a Unix cron-job routine.

\* \* \* \* \*